United States Patent [19]

Puppolo

[11] Patent Number: 4,622,109

[45] Date of Patent: Nov. 11, 1986

[54] SOLID ELECTROLYTE CAPACITOR PROCESS

[75] Inventor: Henry F. Puppolo, North Adams, Mass.

[73] Assignee: Sprague Electric Company, North Adams, Mass.

[21] Appl. No.: 742,347

[22] Filed: Jun. 7, 1985

[51] Int. Cl.$^4$ .............................................. H01G 9/24
[52] U.S. Cl. .................................... 204/38.3; 29/570; 204/37.1; 361/433
[58] Field of Search ................ 204/37.1, 38.3; 29/570; 361/433; 427/80

[56] References Cited

U.S. PATENT DOCUMENTS

| | | | |
|---|---|---|---|
| 3,248,618 | 4/1966 | Szpak et al. | 317/258 |
| 4,104,704 | 8/1978 | Weaver | 361/433 |
| 4,184,192 | 1/1980 | Yoshida et al. | 361/433 |
| 4,474,323 | 10/1984 | Weeks et al. | 228/123 |

OTHER PUBLICATIONS

"GE Develops PCB Fabrication Process", Electronic Packaging & Production, v.24, #9, Sep. 1984, pp. 27-28.

*Primary Examiner*—John F. Niebling
*Assistant Examiner*—William T. Leader

[57] ABSTRACT

A solderable metal layer is chemically deposited as an electrical contact on a solid-electrolyte capacitor by replacing the conventional silver contact layer of the capacitor with a layer of colloidal carbon containing a metal which is more electropositive than the solderable metal to be deposited, and thereafter contacting the assembly with a salt solution of the solderable metal. The metal of the salt solution is chemically replaced by the more electropositive metal so that the solderable metal plates out on the carbon surface to form the desired solderable contact layer. The salt solution is preferably a copper or nickel salt solution, and the more electropositive metal is preferably iron.

7 Claims, No Drawings

SOLID ELECTROLYTE CAPACITOR PROCESS

BACKGROUND OF THE INVENTION

This invention relates to a solid electrolyte capacitor process, and more particularly to a process for the deposition of a solderable metal layer onto the surface of a solid electrolyte capacitor by chemical means.

It is conventional in the prior art to produce a solid electrolyte capacitor by anodizing a valve-metal pellet, coating the dielectric oxide thus formed with a solid electrolyte, applying a layer of graphite or colloidal carbon as a cathode contact to the solid electrolyte, and applying a layer of silver paint or silver epoxy over the carbon. It is also conventional to solder a cathode lead to the silver layer after the layer is cured.

Unfortunately, while the silver layer is easy to apply, it is expensive. It also migrates during capacitor operation into the solder used to apply the cathode lead to the detriment of continued capacitor operation. Using a paint or epoxy containing a solderable metal other than silver, e.g., copper, has not been satisfactory as it has proved difficult to solder the cathode leads to such cured paints.

Other solderable materials, namely copper, have been applied as sprayed layers or electroplated onto the carbon surface. These techniques are relatively expensive, which is why the silver paints have enjoyed such widespread usage. Attempts to replace part of the silver in the paint with another metal, e.g., copper, have improved but have not solved the silver migration problem.

Electroless plating of metals has been used in the manufacture of solid-electrolyte capacitors, but to replace the solid electrolyte rather than plate over it. By and large, the solutions used to prepare or catalyze the surface to be plated are harmful to the solid-electrolyte layer, particularly when it is manganese dioxide.

Therefore, it would be advantageous to be able to replace the silver layer with a different solderable metal using a simple process to do so and without damaging the solid-electrolyte layer.

SUMMARY OF THE INVENTION

This invention provides a plated metal electrical contact layer on a solid electrolyte capacitor via a chemical replacement reaction. The capacitor anodes are processed as usual through the deposition of the solid electrolyte and reformation. A carbon layer is deposited as usual except that the colloidal carbon material contains a metal which is more electropositive than the metal to be plated. The carbon layer containing the metal is dried, and the unit immersed in a solution of a salt of the metal to be plated. The more electropositive metal goes into the solution reducing the metal of the metal salt which plates onto the carbon surface and provides a solderable electrical contact layer.

Optionally, a carbon layer which does not contain metal may be deposited on the solid electrolyte first, and then the carbon containing the metal is deposited over it. The carbon layer which contains the metal may also contain finely-divided particles of a second metal to act as a seed or activating agent.

DESCRIPTION OF THE PREFERRED EMBODIMENTS

A solid electrolyte capacitor is made by anodizing a porous valve-metal pellet, preferably tantalum, to form a dielectric oxide layer. A solid electrolyte, preferably manganese dioxide, is deposited on this oxidized surface by repeated dipping into a precursor solution followed by pyrolysis. The unit is then reanodized (reformed) to heal any defects in the anodic oxide layer caused by pyrolysis.

At this stage, it is usual to deposit a carbon cathode contact layer by dipping the unit into a colloidal carbon slurry such as Aquadag or Electrodag available from Acheson Colloids Co., Port Huron, Mich. and then drying the coating.

It has been found possible to immersion plate the electrical contact layer over the carbon layer by adding to the colloidal carbon slurry, before it is applied, a metal in finely-divided form which is more electropositive than the metal to be plated. The carbon layer is dried as usual, and then the unit is immersed in a metal salt solution, the cation of which is the metal to be plated. The more electropositive metal is oxidized and goes into solution while the metal cation is reduced, plating out onto the carbon surface.

This electrical contact layer is then covered with solder and a cathode lead is attached or a cathode lead is soldered directly to the layer. The unit is then molded, encapsulated, or placed in a metal can in which case a lead is not attached as the can serves as cathode and the unit is soldered to the can.

The electropositive metal is one which is sufficiently more electropositive for the redox replacement reaction to occur readily excluding those metals which will have a deleterious effect on the manganese dioxide electrolyte, e.g., tin. It is preferable that the metal be relatively inexpensive; magnesium, aluminum, zinc, nickel, or iron are suitable candidates for the electropositive metal with iron and nickel preferred.

A mixture of iron and nickel or iron and copper may be used in the colloidal carbon; the nickel and copper appear to activate the reaction. While the nickel could also go into the solution, it is more likely that it would act as a seed for the plating as the copper would since it is less electropositive than iron.

While good results have been obtained by depositing the carbon layer containing the metal directly over the solid electrolyte layer, it may be preferable to deposit a plain carbon layer on the solid electrolyte to ensure its protection and then deposit the carbon-metal layer over it.

Solid tantalum capacitors rated at 15 $\mu$F/20 VDC were processed as usual through the deposition of the manganese dioxide solid electrolyte and reformation. Seven units formed the control group and were dipped in an ordinary colloidal carbon slurry and dried at 85° C. for 30 minutes. They were then dipped into a silver paint available from E. I. DuPont de Nemours & Co. as du Pont 4817, then into a silver-bearing solder, assembled in cans, and tested for electrical parameters.

The experimental group (7 units) were dipped into a mixture of 5 g of the carbon slurry (20% solids), 5 g isopropanol, 15 g of −325 mesh iron powder, and 7.5 g of 10$\mu$ copper powder. These units were dried at 125° C. for 15 minutes, cooled, and immersed in a copper sulfate solution containing 4.5 g cupric sulfate in 150 ml distilled water having a pH of 1.9 after adjustment with concentrated sulfuric acid. An exchange reaction takes place with the iron being oxidized and going into solution forming aqueous ferrous sulfate, and the copper of the cupric sulfate being reduced and plating onto the carbon surface. The reaction time was three to four minutes under these laboratory conditions. The units were dipped into distilled water to remove traces of solution, air-dried, and immersed in the silver-bearing solder and finished as above.

The mean values for the control units were: capacitance 13.441 μF, percent DF 1.38%, ESR 1.349 ohms, and five-minute leakage current at 20 VDC 0.048 μA. Corresponding values for the experimental units were: 13.345 μF, 1.56%, 1.538 ohms, and 0.038 μA.

A set of 330 μF/ 6 VDC units were prepared and tested as above (except leakage current was measured at 6 V). The mean values for the control units were: 309.4 μF, 5.81%, 0.250 ohms, and 6.55 μA. Those for the experimental units were: 306.4 μF, 5.86%, 0.255 ohms, and 2.98 μA.

The data show that there was no impairment in electrical parameters by replacing the silver contact layer of the controls by the copper contact layer. The solder adhered to the plated copper layer which has not always been the case when a copper paint was used to replace the silver paint.

Thus, the process of the present invention provides a simple, economic method of replacing the silver contact layer in solid electrolyte capacitors by another solderable metal, preferably copper. Such replacement not only reduces the cost of the capacitor but also avoids the problems associated with silver migration during capacitor migration.

Although the experimental units were made using a silver-bearing solder, other solders may be used depending on capacitor operating conditions, e.g., indium for higher temperature operations.

What is claimed is:

1. A process for making a solid electrolyte capacitor comprising anodizing a porous valve-metal anode pellet to form a dielectric oxide thereon, depositing a layer of solid electrolyte over said dielectric oxide, depositing at least one carbon layer over said solid electrolyte, one carbon layer containing particles of at least one metal which is more electropositive than a subsequently deposited solderable metal, and depositing said solderable metal onto said carbon layer by a chemical replacement reaction carried out by treating said carbon layer with a metal salt solution to replace said more electropositive metal in said carbon layer by the metal of said metal salt.

2. A process according to claim 1 wherein said more electropositive metal is chosen from the group of iron, copper, nickel, and zinc.

3. A process according to claim 2 wherein said carbon layer contains iron, said metal salt is a copper salt, and said copper of said copper salt replaces said iron, thereby forming a plated coating of said copper over said carbon.

4. A process according to claim 3 wherein said metal salt is cupric sulfate.

5. A process according to claim 2 wherein said metal salt is a nickel salt.

6. A process according to claim 1 wherein at least two carbon layers are deposited over said solid electrolyte, and the first of said carbon layers deposited onto said solid electrolyte contains no metal particles.

7. A process according to claim 1 wherein said valve-metal is tantalum.

* * * * *